United States Patent [19]
Bernreuther et al.

[11] Patent Number: 5,521,478
[45] Date of Patent: May 28, 1996

[54] ACTUATOR USED FOR HEATING, COOLING AND CLIMATIC VALVES IN VEHICLES

[75] Inventors: Georg Bernreuther; Gerhard Bopp, both of Nuremberg, Germany

[73] Assignee: Gebr. Bühler Nachfolger GmbH, Nürnberg, Germany

[21] Appl. No.: 280,762

[22] Filed: Jul. 25, 1994

[30] Foreign Application Priority Data

Jul. 24, 1993 [DE] Germany ............................ 43 24 911.6

[51] Int. Cl.⁶ .................................................. G05B 11/18
[52] U.S. Cl. .......................... 318/592; 318/12; 310/68 B; 310/83; 310/232; 251/129.01; 74/473 R
[58] Field of Search ...................................... 310/68 B, 83, 310/232, 241; 318/592, 12; 251/129.01; 74/473

[56] References Cited

U.S. PATENT DOCUMENTS 3,633,457  1/1972  Reeber et al. .................... 310/68 B
4,020,645  5/1977  Pittatore ............................ 310/83
5,156,243  10/1992 Aoki et al. ........................ 74/473

*Primary Examiner*—William M. Shoop, Jr.
*Assistant Examiner*—Karen Masih
*Attorney, Agent, or Firm*—Popham, Haik, Schnobrich & Kaufman, Ltd.

[57] ABSTRACT

An actuator for heating, cooling and climatic valves in vehicles includes a gear housing, an electric motor placed therein, a reduction gear acted on by the turning moment of the electric motor, a drive shaft and a position determining device connected thereto. A slide carrier with teeth on its perimeter allows use of an adjusting tool to make adjustments to the position determining device. Other fixing areas are provided on the slide carrier and in the driven gear which make it possible to form lock the slide carrier to the driven gear by means of a rapidly hardening substance without damaging the gear.

21 Claims, 2 Drawing Sheets

ACTUATOR USED FOR HEATING, COOLING AND CLIMATIC VALVES IN VEHICLES

FIELD OF THE INVENTION

The present invention relates to an actuator. More specifically, the present invention relates to an actuator used for heating, cooling and climatic valves, consisting of a gear housing, an electric motor placed therein, a reduction gear acted on by the turning moment of the electric motor, a drive shaft and a position determining device connected to the drive shaft.

RELATED ART

Actuator used for heating, cooling, and climatic valves in vehicles are known in the prior art. German patent application DE-OS 38 35 773 shows an actuator having a gear housing, an electric motor placed therein, a reduction gear acted on by the turning moment of the electric motor, a drive shaft connected to the driven gear and a position determining device connected to the drive shaft. The position determining device includes a guide plate with a type switch and a slide carrier connected to the output shaft and having slide brushes mounted on one side to transfer the control current. The slide carrier is shaped like a flange land has a cylindrical bushing piece that is pushed on to the drive shaft.

In an actuator for heating, cooling and climatic valves, an exact relationship between the valve position and the location of the slide on the position determining device is required. As a rule, the adjustment requires a time consuming, usually manual, procedure during assembly or when installing the device into the air conditioner.

Actuators, such as those disclosed in German patent DE-OS 38 35 773, indicate that the adjustment between the valve and the position determining device is obtained by means of a friction connection between the drive shaft and the position determining device. These actuators have a disadvantage in that the adjusting moment must be relatively high in order to produce a continuous lock that will not loosen. The adjustment procedure is thereby made more difficult. Another disadvantage of this type of actuator is that a very precise determination of the frictional connection must be made so that the connection does not loosen due to usual temperature fluctuations in the vehicle.

In another known solution, the adjustment is made by soldering the position determining device, such as a potentiometer, into a guide plate. The acceptance holes in the guide plate are somewhat larger or formed as elongated holes in order to make possible various fitting positions of the potentiometer connections. Since the soldering work must be performed prior to the final assembly, positional inaccuracies can occur between the potentiometer and the drive shaft in previously mounted actuators despite the adjustment procedure.

SUMMARY OF THE INVENTION

It is an object of the present invention to provide an actuator wherein the position determining can be adjusted exactly, continuously and cost effectively.

According to the present invention, a rotatable flange with slide brushes attached thereto is adjusted by means of a relatively slight force as compared to the drive shaft, then rendered non-rotatable and fixed permanently. The adjustment can be done by means of teeth into which an adjusting pinion of an adjusting tool is externally inserted. The teeth can be located on the perimeter of a flange to which the slide brushes are mounted. A relatively fine adjustment is possible because of a relationship between the number of teeth of the adjusting pinion and the number of teeth of the flange having teeth on the outer side thereof.

After the correct position is reached, the pinion can be removed and the adjusted position of the flange can be fixed relative to the drive shaft. The fixing can be done by means of injection of a rapidly hardening mass, e.g., a precipitation hardened mass, in a manner similar to a injection pouring process, into an injection canal in the driven gear with teeth. The hardened mass distributes itself between crenelated recesses in the abrasive carrier of the position determining device and the injection canals and partially fills up the recesses. After hardening, the hardened mass comprises a form lock as a carrier part. During operation, the hardened mass is not strongly stressed, since the forces which act upon it are composed solely of frictional forces of the slide mechanism and frictional forces which may be caused by the axial movement of the driven gear with teeth.

It is, however, also possible, that the final fixing can be achieved by means of stoppers or rivets which connect the slide carrier in a form lock with the drive shaft. However, this could result in deformations that can appear on the driven gear and the slide mechanism which could have disadvantageous effects. Another possibility is to glue the two parts to be fixed to each other or to press the parts together when hot, but the latter could lead to damage in the gear due to the resultant heat effect. Ultra-sound welding is also a possibility, however, the accessibility of the welding electrodes may not be satisfactory.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
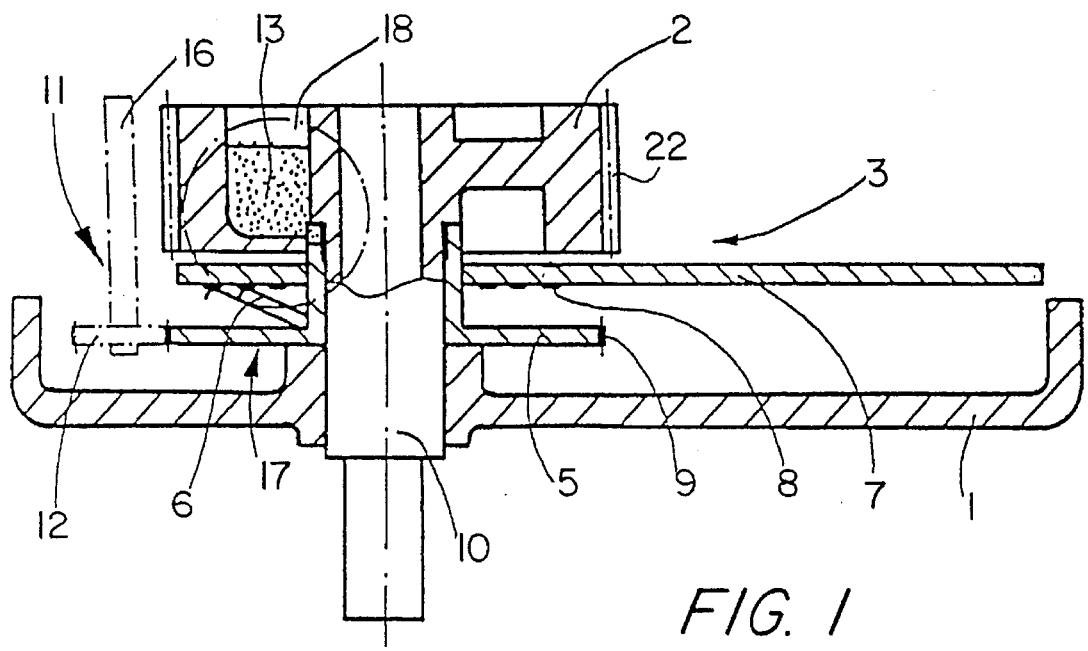
FIG. 1 shows a driven gear with teeth and a position determining device.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
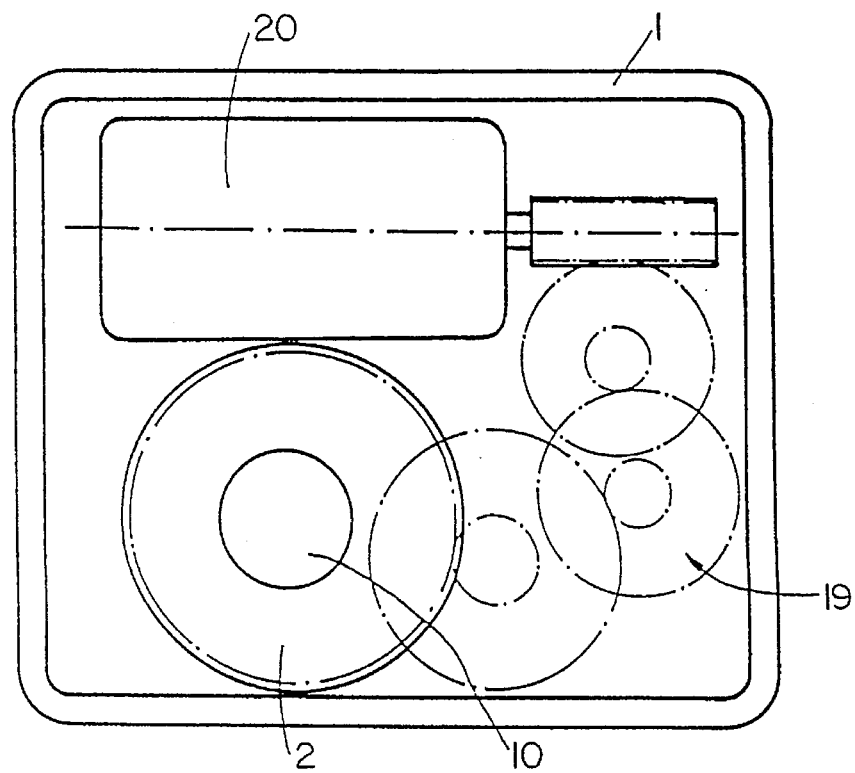
FIG. 2 shows an overhead view of the position determining device.

FIG. 2 shows a positioning device for heating, cooling and climatic valves. The device includes a gear housing 1, an electric motor 20, a reduction gear 19, a position determining device 3 and a drive shaft 10. The reduction gear 19 preferably consists of a worm gear stage and several cylinder gear reduction stages whose number and size depend on the specific implementation of the device.

Figure 1A:
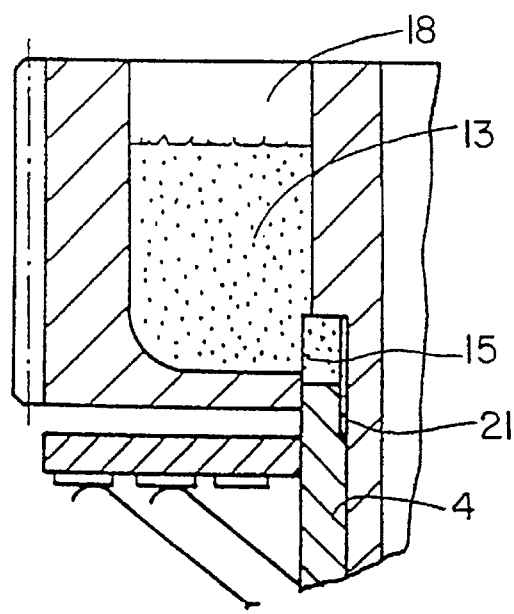
FIG. 1a shows an enlarged cut-out from an area between the driven gear with teeth and the position determining device.

As shown in FIG. 1 and FIG. 1a, a driven gear 2 having teeth 22 is connected to a drive shaft 10. Located between the driven gear 2 and the gear housing 1 is the position determining device 3. The position determining device 3 is driven by the drive shaft 10 and consists of two parts: a fixed guide plate 7 on which slide tracks 8 are located and a slide carrier 17. The slide carrier 17 consists of a flange 5, slide brushes 6 attached thereto, and a bushing 4 with crenelated recesses 14. When slide tracks 8 are made of a resistive material, position determining device 3 forms a potentiometer. It is also possible to use a a conductive material of slide tracks 8 to make the electrical connection with the brushes 6 of the slide carrier 17. In that case, the position determining device 3 forms a switch.

The perimeter of the flange 5 has teeth 9 that provide a fine adjustment for the position determining device 3. Instead of the teeth 9, it is also possible to use recesses, cut-outs, or indentations to provide the fine adjustment. The adjustment of the position determining device 3 occurs preferably with the gear housing 1 opened using an adjusting tool 11, consisting of a clamping shank 16 and an adjusting pinion 12 attached thereto. During automatic adjustment, the clamping shank 16 serves as a receptacle piece for the adjusting device. It is also possible to manually make the adjustment using a special manual adjustment tool.

The gear housing is advantageously shaped to help guide the adjusting tool 11 and to prevent deviation of the adjusting pinion 12 from the teeth 9 of the flange 5. It is not necessary, however, to shape the gear housing this way if the adjusting tool 11 is constructed in a stable enough manner.

The adjustment procedure can also be done with the gear housing 1 closed if there are recesses in the gear housing 1 sufficient to provide for the adjustment tool 11 and the injection jet. The recesses can be closed later by stoppers, glue, etc.

Figure 3:
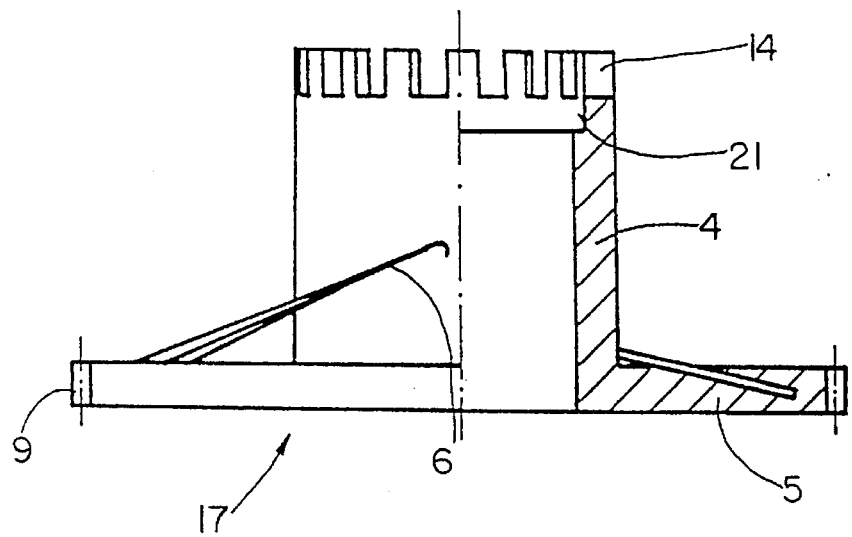
FIG. 3 shows a slide carrier.

As shown in FIG. 3, there are crenelated recesses 14 at one end of the bushing 4 and a cylinder shaped relief 21 near the recesses 14. One or more injection canals 18 are located in the driven gear 2, each canal 18 having a side opening 15 which is aligned with one or more recesses 14 next to each other near the bushing 4. The mass to be injected moves through the openings 15 of the injection canals 18 into the relief 21 and the recesses 14 to form a carrier part after hardening. The driven gear 2 is thereby continuously and irreversibly connected with the abrasive carrier 17. It is also possible to use other shapes instead of the recesses 14 to provide the form lock using the hardened mass.

Adjustment can be done by hand, but automatic adjustment is preferred as is simultaneous fixing of the abrasive carrier 17 using only a single device and a single work step.

Adjustment Procedure

The gear mounted on the sealed housing cover is fixed in a mount for the adjustment device. The drive shaft 10 is attached to the driven gear 2 in a given angular position. The mounting device simultaneously aligns and holds the axes of the gear elements so that the position determining device 3 will not go out of adjustment after the gear cover is attached. The position determining device 3 of the actuator is electrically connected to the adjustment device and the adjusting tool 11 is brought in contact with the teeth 9 on the perimeter of the slide carrier 17.

Finally the actual position of the slide brushes is measured in the adjustment device and compared with an expected position. Depending on the deviation, the slide carrier 17 is adjusted by turning the adjustment pinion 12 up or down, so that the deviation can be corrected.

Once positioned, the driven gear 2 and the drive shaft 10 are continuously and irreversibly connected to the slide carrier 17. The connection can be made by injecting into the injection canals 18 a rapidly hardening substance 13, e.g., a precipitation hardened mass such as Polyamid Helmidur 39320 manufactured by the Forbo Helmitin Company of Pirmasens Germany. The entire adjustment procedure preferably occurs automatically.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An actuator, for heating, cooling and air conditioning valves in vehicles, comprising:

a gear housing;

an electric motor placed in the gear housing;

a reduction gear acted on by rotation of the electric motor;

a drive shaft; and a position determining device, connected to the drive shaft, including a slide mechanism with slide brushes acting in conjunction with means for making an electrical connection with the slide brushes, the slide brushes being mounted on a flange connected to the drive shaft, wherein a part of the position determining device is connected to the drive shaft and has along an edge thereof means for providing a fine adjustment of a turning position of the drive shaft in relation to the slide carrier and a guide plate, and wherein another part of the position determining device is connected to the drive shaft and has means for providing a form lock with a part of the drive shaft, and wherein a portion of the drive shaft has recesses for providing a form lock with a portion of the position determining device.

2. An actuator according to claim 1, wherein the means for making an electrical connection with the slide brushes includes at least one of a switch and slide tracks of a potentiometer.

3. An actuator according to claim 1, wherein the means for providing a fine adjustment includes teeth.

4. An actuator according to claim 1, wherein the means for providing a form lock includes at least one recesses and shapes.

5. An actuator according to claim 1, wherein the form lock is provided using a precipitation hardened mass which connects the means for providing a form lock and the recesses of the drive shaft according to precipitation hardening characteristics of the mass.

6. An actuator according to claim 1 wherein the form lock is provided using at least one of stoppers and clamp pins.

7. An actuator according to claim 1 wherein the position determining device incude a flange having teeth on the perimeter thereof.

8. An actuator according to claim 7 further comprising a bushing having crenelated recesses connected to the flange.

9. An actuator according to claim 1 wherein the position determining device includes a bushing having a cylindrical relief on the inside thereof.

10. An actuator according to claim 8 wherein the bushing has a cylindrical relief on the inside thereof.

11. An actuator according to claim 1 wherein the position determining device includes a driven gear having injection channels with walls that are equipped with side openings matching crenelated recesses of a bushing that is also part of the position determining device.

12. An actuator according to claim 8 wherein the position determining device includes a driven gear having injection channels with walls that are equipped with side openings matching the crenelated recesses of the bushing.

13. An actuator according to claim 1 wherein a precipitation hardened mass is provided via injection canals and forms a continuous form lock connection between the drive shaft and a part of the position determining device.

14. An actuator according to claim 8 wherein a precipitation hardened mass is provided via injection canals and forms a continuous form lock connection between the drive shaft and a part of the position determining device.

15. An actuator according to claim 11 wherein a precipitation hardened mass is provided via injection canals and forms a continuous form lock connection between the drive shaft and a part of the position determining device.

16. An actuator according to claim 12 wherein a precipitation hardened mass is provided via injection canals and forms a continuous form lock connection between the drive shaft and a part of the position determining device.

17. An actuator according to claim 1 wherein recesses are provided in the gear housing to allow for an adjusting tool and for an injection jet.

18. An actuator according to claim 1 wherein guides are provided in the gear housing to guide an adjusting tool.

19. An actuator according to claim 17 wherein guides are provided in the gear housing to guide the adjusting tool.

20. A method of adjusting an actuator, for heating, cooling and air conditioning valves in vehicles, the actuator having a gear housing, an electric motor placed in the gear housing, a reduction gear acted on by rotation of the electric motor, a drive shaft, and a position determining device, connected to the drive shaft, including a slide mechanism with slide brushes acting in conjunction with means for providing an electrical connection with the slide brushes, the slide brushes being mounted on a flange connected to the drive shaft, wherein a part of the position determining device is connected to the drive shaft and has along an edge thereof means for providing a fine adjustment of a turning position of the drive shaft in relation to the slide carrier and a guide plate, and wherein another part of the position determining device is connected to the drive shaft and has means for providing a form lock with a part of the drive shaft, and wherein a portion of the drive shaft has recesses for providing a form lock with a portion of the position determining device, the method comprising the steps of:

providing a fine adjustment of the turning position of the drive shaft with an adjusting tool;

adjusting the position determining device with the adjusting tool by comparing an actual position of the position determining device with an expected position thereof; and fixing the position of the position determining device with the adjusting tool.

21. A method of adjusting an actuator, for heating, cooling and air conditioning valves in vehicles, the actuator having a gear housing, an electric motor placed in the gear housing, a reduction gear acted on by rotation of the electric motor, a drive shaft, and a position determining device, connected to the drive shaft, including a slide mechanism with slide brushes acting in conjunction with means for providing an electrical connection with the slide brushes, the slide brushes being mounted on a flange connected to the drive shaft, wherein a part of the position determining device is connected to the drive shaft and has along an edge thereof means for providing a fine adjustment of a turning position of the drive shaft in relation to the slide carrier and a guide plate, and wherein another part of the position determining device is connected to the drive shaft and has means for providing a form lock with a part of the drive shaft, and wherein a portion of the drive shaft has recesses for providing a form lock with a portion of the position determining device, the method comprising the steps of:

providing a fine adjustment of the turning position of the drive shaft with an adjusting tool; and simultaneously adjusting the position determining device with the adjusting tool by comparing an actual position of the position determining device with an expected position thereof while fixing the position of the position determining device.

* * * * *